United States Patent
Kiyamura

(10) Patent No.: US 10,120,201 B2
(45) Date of Patent: Nov. 6, 2018

(54) LENS BARREL AND OPTICAL DEVICE

(71) Applicant: CANON KABUSHIKI KAISHA, Tokyo (JP)

(72) Inventor: Kousuke Kiyamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 15/198,559

(22) Filed: Jun. 30, 2016

(65) Prior Publication Data

US 2017/0003516 A1 Jan. 5, 2017

(30) Foreign Application Priority Data

Jul. 2, 2015 (JP) .................... 2015-133355

(51) Int. Cl.
 *G02B 27/64* (2006.01)
 *G02B 7/10* (2006.01)

(52) U.S. Cl.
 CPC .......... *G02B 27/646* (2013.01); *G02B 7/102* (2013.01)

(58) Field of Classification Search
 CPC .......... G02B 27/646; G02B 7/08; G02B 7/09; G02B 7/04; G02B 7/28; G02B 7/282; G03B 3/10; G03B 5/00; G03B 5/02; G03B 2205/0007; G03B 2205/0015; G03B 2205/0069; G03B 2205/0046; G03B 2205/0053; G03B 5/04; H04N 5/2253; H04N 5/2254; H04N 5/2328; H04N 5/23287; H02K 41/0356

USPC ................. 359/557, 824, 825; 396/55
See application file for complete search history.

(56) References Cited

U.S. PATENT DOCUMENTS

| 2011/0317987 | A1* | 12/2011 | Nakayama | G02B 27/646 396/55 |
| 2014/0099087 | A1* | 4/2014 | Yasuda | G02B 27/646 396/55 |
| 2014/0119717 | A1* | 5/2014 | Yasuda | G02B 27/646 396/55 |

FOREIGN PATENT DOCUMENTS

JP 2014-089325 A 5/2014

* cited by examiner

*Primary Examiner* — Marin Pichler
(74) *Attorney, Agent, or Firm* — Cowan, Liebowitz & Latman, P.C.

(57) ABSTRACT

A lens barrel that is capable of reducing unnecessary movement of an optical element. A first unit has a first correction optical element arranged on an optical axis and a first magnet that moves the first correction optical element along a first spherical surface around a first point on the optical axis. A second unit has a second correction optical element arranged on the optical axis and a second magnet that moves the second correction optical element along a second spherical surface of which radius is smaller than the radius of the first spherical surface around a second point on the optical axis. A magnetic body is arranged on at least one of the first unit and the second unit, and reduces leakage of magnetic flux from a facing part of the second magnet that faces the first magnet.

16 Claims, 14 Drawing Sheets

FIG. 3A
FIG. 3B
FIG. 3C
FIG. 3D
FIG. 3E
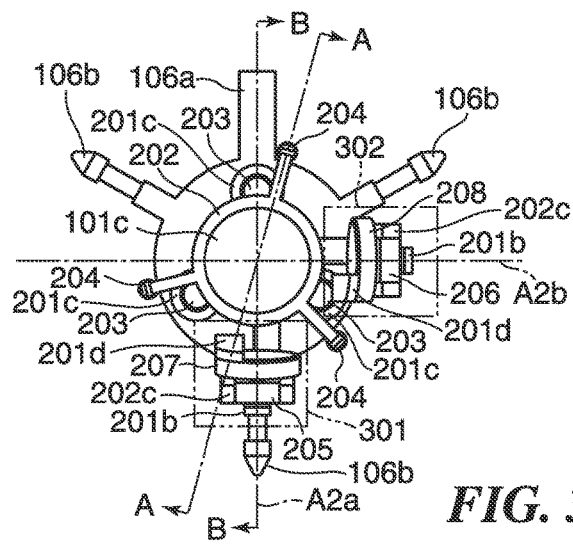
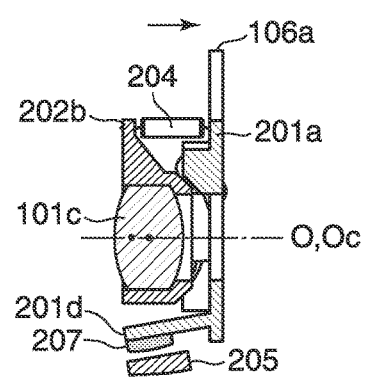
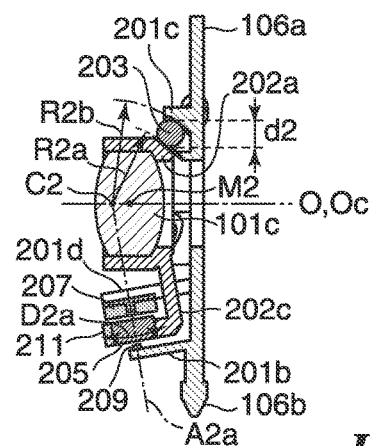
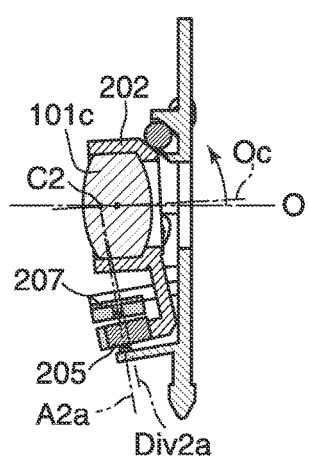
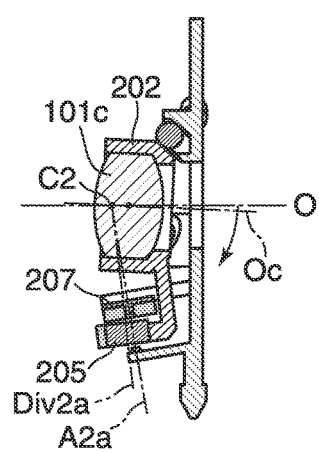

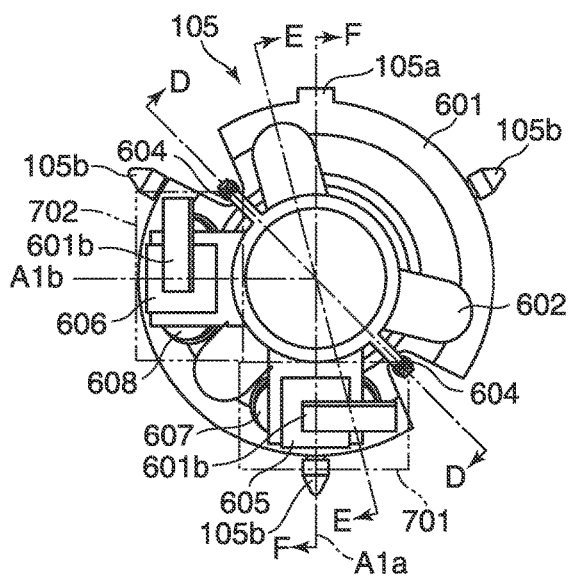
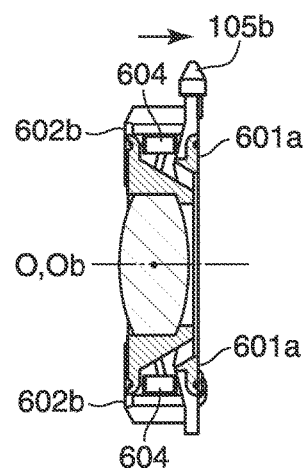
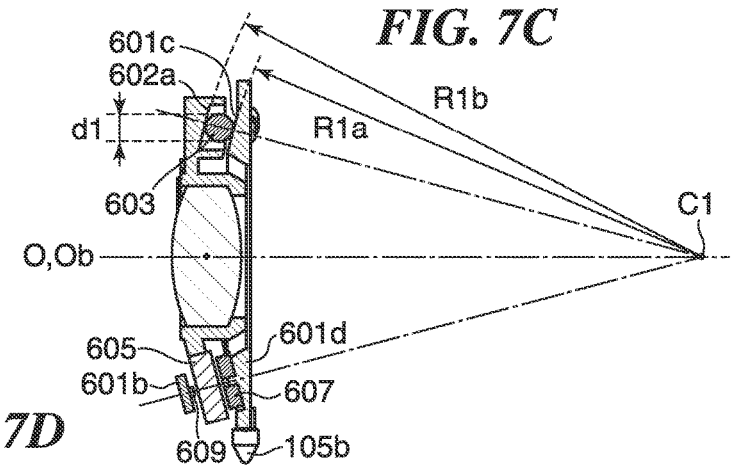
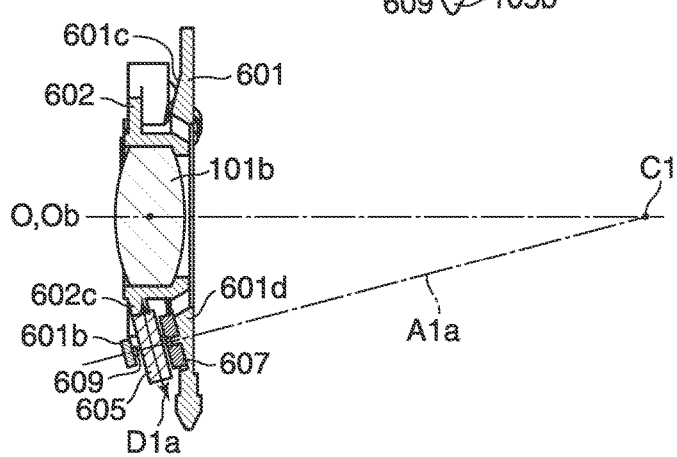

LENS BARREL AND OPTICAL DEVICE

BACKGROUND OF THE INVENTION

Field of the Invention

The present invention relates to a lens barrel and an optical device, and in particular, relates to the lens barrel and the optical device that are capable of correcting a blur of an image formed on an imaging plane.

Description of the Related Art

There are some lens barrels that have optical systems for forming an image on an image plane and image stabilizers for reducing a blur of the image formed on the image plane by moving a correction lens as an optical element included in the optical system concerned. An image stabilizer is provided with a magnet and a coil for moving a correction lens. When electric current is applied to the coil, electromagnetic force that acts between the magnet and the coil moves the correction lens along a spherical surface of which the center is a point on an optical axis, which corrects a blur of the image formed on the image plane (for example, see Japanese Laid-Open Patent Publication (Kokai) No. 2014-089325 (JP 2014-089325A)). Moreover, there is a known lens barrel that has a plurality of image stabilizers and controls a blur of an image formed on an image plane by cooperation of the image stabilizers with high accuracy.

However, the image stabilization may not be controlled properly in the image stabilization process of the lens barrel with the plurality of image stabilizers. Usually, a lens barrel for a camera has a plurality of units equipped with optical elements including a correction lens that are arranged along an optical axis. And the units are closely arranged in order to miniaturize the lens barrel. Accordingly, when a lens barrel provides a plurality of image stabilizers, the image stabilizers may be closely arranged. In such a case, magnetic attraction that occurs between the magnets of the adjacent image stabilizers moves correction lenses of the image stabilizers concerned to unintended positions. As a result, the image stabilizers are not controlled properly in the image stabilizing process. That is, the conventional lens barrel may move the optical elements unnecessarily due to the magnetic attraction that occurs between the magnets of the adjacent image stabilizers.

SUMMARY OF THE INVENTION

The present invention provides a lens barrel and an optical device that are capable of reducing unnecessary movement of an optical element.

Accordingly, a first aspect of the present invention provides a lens barrel including a first unit configured to have a first correction optical element arranged on an optical axis, and a first magnet that moves the first correction optical element along a first spherical surface around a first point on the optical axis, a second unit configured to have a second correction optical element arranged on the optical axis, and a second magnet that moves the second correction optical element along a second spherical surface of which radius is smaller than the radius of the first spherical surface around a second point on the optical axis, and a magnetic body configured to be arranged on at least one of the first unit and the second unit, and to reduce leakage of magnetic flux from a facing part of the second magnet that faces the first magnet.

Accordingly, a second aspect of the present invention provides an optical device including a first member holding a first coil, a second member holding a first magnet and a first optical element, and a first actuator configured to rotate the second member with respect to the first member using the first coil and the first magnet around a rotation axis that is not parallel to an optical axis of the first optical element. The first magnet is in contact with a magnetic body at an adjacent surface adjacent to a surface facing the first coil so as to reduce magnetic flux density at the side of the adjacent surface of the first magnet.

According to the present invention, unnecessary movement of an optical element is reduced.

Further features of the present invention will become apparent from the following description of exemplary embodiments with reference to the attached drawings.

BRIEF DESCRIPTION OF THE DRAWINGS

FIG. 3A is a plan view of the second image stabilizer in FIG. 2A after assembling viewed from the object side. FIG. 3B is a sectional view taken along the line A-A in FIG. 3A. FIG. 3C, FIG. 3D, and FIG. 3E are sectional views taken along the line B-B in FIG. 3A.

FIG. 7A is a plan view of the first image stabilizer in FIG. 6A after assembling viewed from the object side. FIG. 7B is a sectional view taken along the line D-D in FIG. 7A. FIG. 7C is a sectional view taken along the line E-E in FIG. 7A. FIG. 7D is a sectional view taken along the line F-F in FIG. 7A.

DESCRIPTION OF THE EMBODIMENTS

Hereafter, embodiments according to the present invention will be described in detail with reference to the drawings.

Figure 1A:
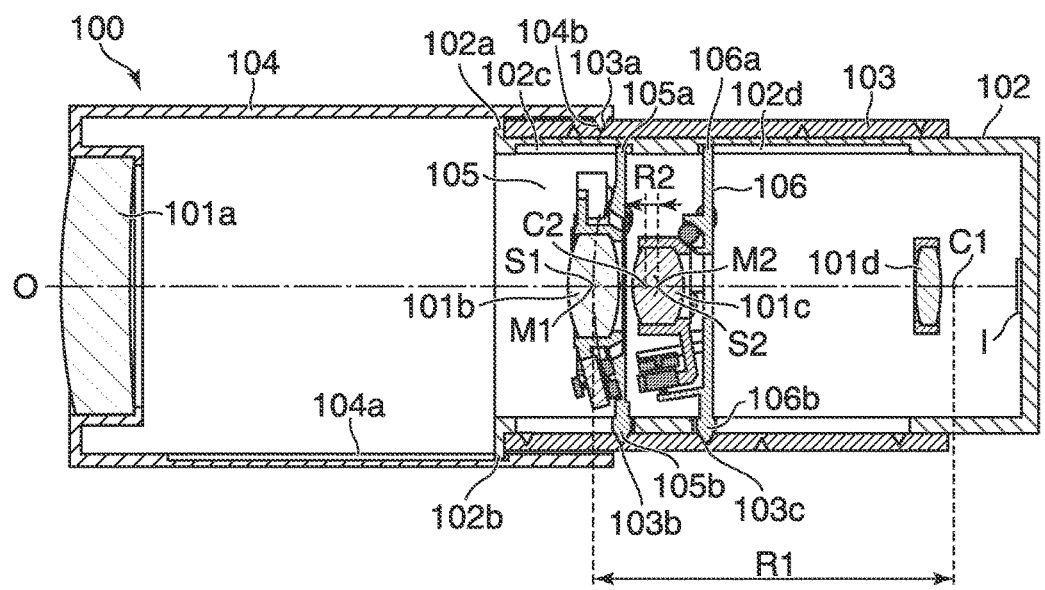
FIG. 1A is a sectional view schematically showing a configuration of a lens barrel according to an embodiment of the present invention in a TELE state.
Figure 1B:
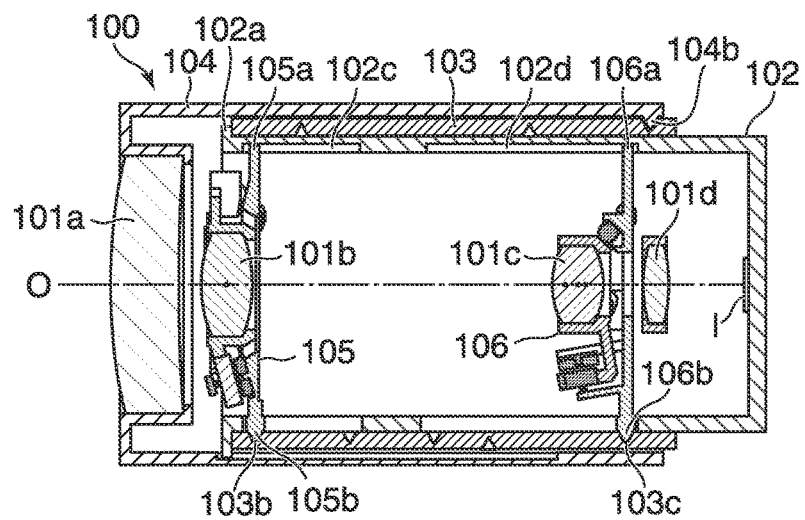
FIG. 1B is a sectional view schematically showing the configuration of the lens barrel in a WIDE state.

FIG. 1A is a sectional view schematically showing a configuration of a lens barrel 100 that is an optical device according to an embodiment of the present invention in a TELE state. FIG. 1B is a sectional view schematically showing the configuration of the lens barrel 100 in a WIDE state.

As shown in FIG. 1A, the lens barrel 100 is provided with a zoom lens 101a, focusing lens 101d, guide barrel 102, cam ring 103, zoom lens barrel 104, first image stabilizer (first unit) 105, and second image stabilizer (second unit) 106. The first image stabilizer 105 is provided with a first correction lens (first optical element) 101b. The second image stabilizer 106 is provided with a second correction lens (second optical element) 101c.

The zoom lens 101a, first correction lens 101b, second correction lens 101c, and focusing lens 101d are arranged along an optical axis O, which coincides with optical axes of the zoom lens 101a and the focusing lens 101d, and also coincides with optical axes of the first correction lens 101b and the second correction lens 101c when the lenses 101b and 101c are in reference states. Light passing through the zoom lens 101a, first correction lens 101b, second correction lens 101c, and focusing lens 101d forms an image on an image plane I arranged in the guide barrel 102. The lens barrel 100 controls the size of the image on the image plane I by moving the zoom lens 101a, first correction lens 101b, and second correction lens 101c cooperatively along the optical axis O. In FIG. 1A, the zoom lens 101a, first correction lens 101b, and second correction lens 101c are located at positions of the TELE state where the image is most largely formed on the image plane I. In FIG. 1B, the lenses are located at positions of the WIDE state where the image is smallest formed on the image plane I. Moreover, the position of the image formed on the image plane I is moved in a direction vertical to the optical axis O by tilting cooperatively the first correction lens 101b and the second correction lens 101c. Furthermore, the lens barrel 100 controls a focus position by moving the focusing lens 101d along the optical axis O.

The guide barrel 102 is formed in a bottomed cylindrical shape around the optical axis O. A contact portion 102a and the guide key 102b are projected in a direction orthogonal to the optical axis O from an outer surface of the guide barrel 102. The image plane I is arranged on an inner surface of the bottom of the guide barrel 102 so that the position of the image plane I overlaps with the zoom lens 101a, first correction lens 101b, second correction lens 101c, and focusing lens 101d when viewing along the optical axis O. Moreover, guide slots 102c and 102d prolonged in parallel with the optical axis O are formed on the inner circumferential surface of the guide barrel 102.

The cam ring 103 is formed in a cylinder shape around the optical axis O, and is supported by the guide barrel 102. The cam ring 103 is energized by an energization means (not shown) so as to always contact the contact portion 102a. The guide barrel 102 fits into the cam ring 103. Accordingly, the cam ring 103 is regulated in a movement in a direction along the optical axis but is allowed in a rotation around the optical axis O with respect to the guide barrel 102. A first cam groove 103a is formed on the outer surface of the cam ring 103, and a second cam groove 103b and the third cam groove 103c are formed on the inner surface of the cam ring 103. Each of the first cam groove 103a, second cam groove 103b, and third cam groove 103c is spirally formed around the optical axis O.

The zoom lens barrel 104 is formed in a cylinder shape around the optical axis O, and holds the zoom lens 101a integrally. A guide slot 104a prolonged in parallel with the optical axis O is formed on the inner surface of the zoom lens barrel 104. Three cam pins 104b are projected in directions orthogonal to the optical axis O from the outer surface of the zoom lens barrel 104a at equal angular intervals. The guide key 102b fits into the guide slot 104a, and the cam pins 104b fit into the first cam groove 103a. Accordingly, when the cam ring 103 rotates around the optical axis O, the zoom lens barrel 104 moves in the direction along the optical axis O without rotating with respect to the guide barrel 102.

The first image stabilizer 105 supports the first correction lens 101b movably. A guide key 105a and a plurality of cam pins 105b that are projected in directions orthogonal to the optical axis O are formed on the first image stabilizer 105. In the embodiment, the three cam pins 105b are formed on the first image stabilizer 105 at equal angular intervals. The guide key 105a fits into the guide slot 102c, the cam pins 105b fit into the second cam groove 103b passing through a slit formed in the guide barrel 102 in parallel with the optical axis O. And accordingly, the first image stabilizer 105 is supported within the guide barrel 102. When the cam ring 103 rotates around the optical axis O, the first image stabilizer 105 moves in the direction along the optical axis O without rotating with respect to the guide barrel 102. The first image stabilizer 105 supports the first correction lens 101b so that the first correction lens 101b is movable along a first spherical surface S1 with radius R1 around a point C1 (first point) on the optical axis O that passes a midpoint M1 of the first correction lens 101b on the optical axis O.

The second image stabilizer 106 supports the second correction lens 101c movably. A guide key 106a and a plurality of cam pins 106b that are projected in directions orthogonal to the optical axis O are formed on the second image stabilizer 106. In the embodiment, the three cam pins 106b are formed on the second image stabilizer 106 at equal angular intervals. The guide key 106a fits into the guide slot 102d, the cam pins 106b fit into the third cam groove 103c passing through a slit formed in the guide barrel 102 in parallel with the optical axis O. And accordingly, the second image stabilizer 106 is supported within the guide barrel 102. When the cam ring 103 rotates around the optical axis O, the second image stabilizer 106 moves in the direction along the optical axis O without rotating with respect to the guide barrel 102. The second image stabilizer 106 supports the second correction lens 101c so that the second correction lens 101c is movable along a second spherical surface S2 with radius R2 around a point C2 (second point) on the optical axis O that passes a midpoint M2 of the second correction lens 101c on the optical axis O. The radius R2 of the second spherical surface S2 is smaller than the radius R1 of the first spherical surface S1. That is, in the embodiment, the second correction lens 101c moves with a radius smaller than the first correction lens 101b.

The lens barrel 100 moves the zoom lens 101a, first correction lens 101b, and second correction lens 101c between the positions of the TELE state in FIG. 1A and the positions of the WIDE state in FIG. 1B by rotating the cam ring 103. In the embodiment, when the lenses are adjusted in the positions of the TELE state, the first image stabilizer 105 is most approximated to the second image stabilizer 106.

Figure 2A:
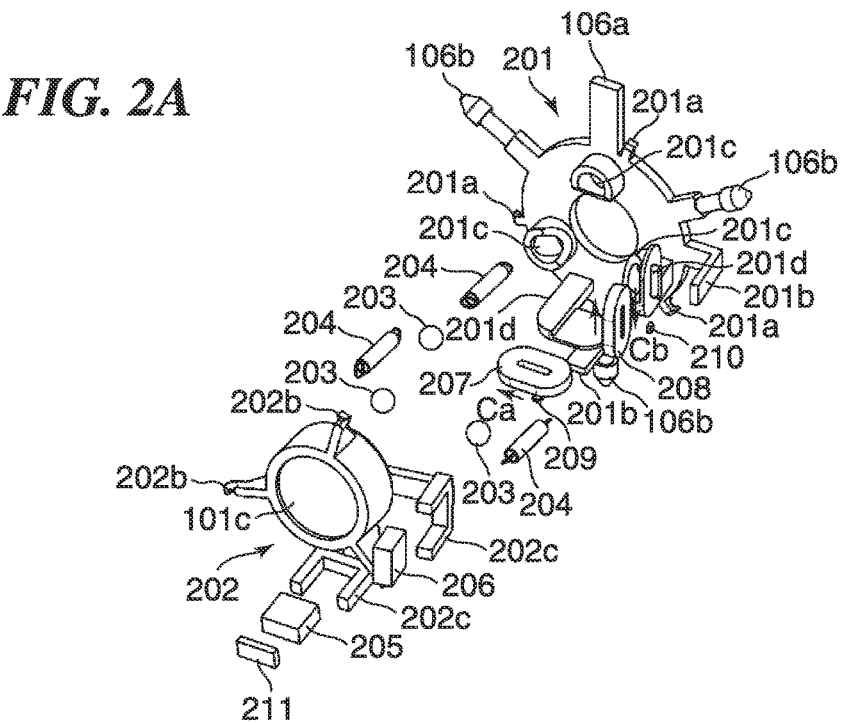
FIG. 2A is an exploded perspective view of a second image stabilizer in FIG. 1A viewed from an object side.
Figure 2B:
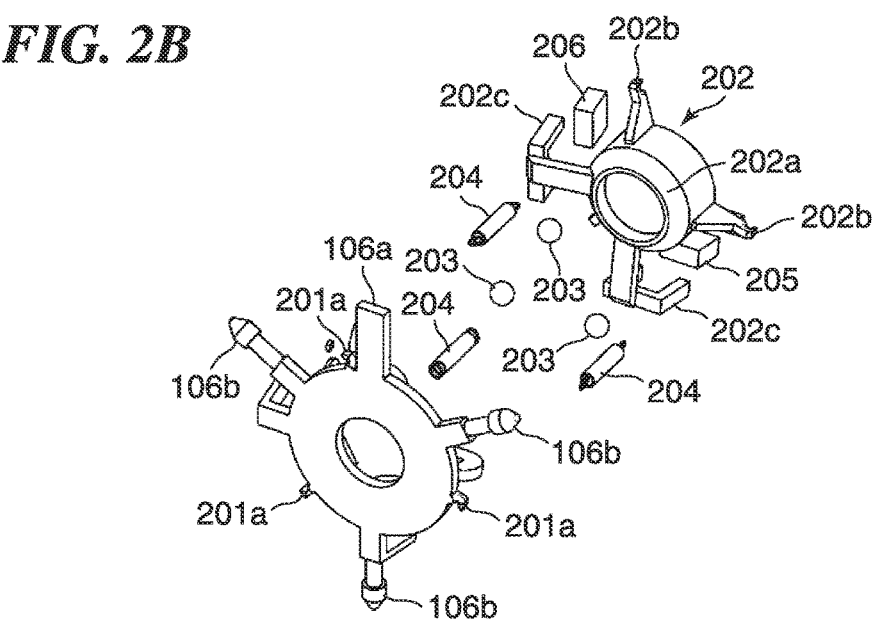
FIG. 2B is an exploded perspective view of the second image stabilizer viewed from an image plane side.

FIG. 2A is an exploded perspective view of the second image stabilizer 106 in FIG. 1 viewed from an object side. FIG. 2B is an exploded perspective view of the second image stabilizer 106 viewed from the image plane I. Moreover, FIG. 3A is a plan view of the second image stabilizer 106 in FIG. 2A after assembling viewed from the object side. FIG. 3B is a sectional view taken along the line A-A in FIG. 3A. FIG. 3C, FIG. 3D, and FIG. 3E are sectional views taken along the line B-B in FIG. 3A.

As shown in FIG. 2A, FIG. 2B, and FIG. 3A through FIG. 3E, the second image stabilizer 106 is provided with a fixed member 201, movable member 202, balls 203, springs 204, magnets (second magnets) 205 and 206, coils 207 and 208, sensors 209 and 210, and magnetic body 211. It should be noted that FIG. 3A through FIG. 3C show a reference state of the second image stabilizer 106 where the second correction lens 101c and the movable member 202 are arranged so that an optical axis Oc of the second correction lens 101c coincides with the optical axis O.

The fixed member 201 has a predetermined thickness in the direction of the optical axis O, and is formed in an approximately disc shape around the optical axis O. The fixed member 201 is provided with an outer surface parallel to the optical axis O, a facing surface facing the movable member 202, and an opening through which the light transmitted through the second correction lens 101c passes in the center. The fixed member 201 is provided with the guide key 106a, three cam pins 106b, three spring hooks 201a, two sensor holding members 201b, three ball support portions 201c, and two coil holding members 201d. The guide key 106a and the cam pins 106b are projected from the outer surface perpendicularly to the optical axis O. The spring hooks 201a are formed in beam shapes and are projected from the outer surface perpendicularly to the optical axis O at equal angular intervals. Each of the sensor holding members 201b has a base portion that is projected from the outer surface perpendicularly to the optical axis O, and a holding portion that extends from a front end of the base portion toward the movable member 202 so as to incline outwardly. The sensors 209 and 210 are held at the front ends of the holding portions. The two sensor holding members 201b are arranged at the angular interval of 90 degrees around the optical axis O. Each of the ball support portions 201c is a part of a concave spherical surface of the radius R2a around the point C2 on the optical axis O. The ball support portions 201c are formed on the facing surface around the optical axis O at equal angular intervals so as to surround the opening. Each of the coil holding members 201d is formed on the facing surface toward the movable member 202 so as to incline outwardly. The coil holding members 201d respectively hold the coils 207 and 208. The two coil holding members 201d are arranged at the angular interval of 90 degrees around the optical axis O.

The movable member 202 has a predetermined thickness in the direction of the optical axis O, and is formed in an approximately disc shape around the optical axis O. The movable member 202 holds the second correction lens 101c in the center, and its outer surface is parallel to the optical axis O. Moreover, the movable member 202 is provided with a ball support portion 202a, three spring hooks 202b, and two magnet holding members 202c. The ball support portion 202a is a part of a convex spherical surface of the radius R2b around the point C2 on the optical axis O, and faces the fixed member 201 along the optical axis O. The spring hooks 201b are formed in beam shapes and are projected from the outer surface perpendicularly to the optical axis O at equal angular intervals. Each of the magnet holding members 201c has a base portion that is projected from the outer surface perpendicularly to the optical axis O, and two arms that extend from a front end of the base portion in a direction opposite to the movable member 202 so as to incline outwardly. Each of the magnets 209 and 210 is held between the arms. The two magnet holding members 201c are arranged at the angular interval of 90 degrees around the optical axis O.

As shown in FIG. 3B, the movable member 202 is held by the fixed member 201 with the springs 204 hung between the spring hooks 202b and the spring hooks 201a of the fixed member 201. As shown in FIG. 3C, the movable member 202 contacts the fixed member 201 via the balls 203. Each of the balls 203 is formed in a spherical shape of the diameter d2. The movable member 202 moves along the ball support portions 201c, when the balls 203 that are caught between the ball support portions 201c and the ball support portion 202a rotate. The radius R2b of the ball support portion 201c is equal to R2a+d2 that is the sum of the radius R2a of the ball support portion 202a and the diameter d2 of the ball 203. Accordingly, even if the movable member 202 moves, the centers of the spherical surfaces of the ball support portion 201c and the ball support portion 202a coincide with the point C2. That is, the second correction lens 101c provided in the movable member 202 is movable along the spherical surface around the point C2 on the optical axis O with respect to the fixed member 201. When external force does not act on the movable member 202, the movable member 202 is held at the position in the reference state by balancing the spring force of the springs 204. On the other hand, when the external force acts on the movable member 202, the movable member 202 moves from the position in the reference state, and the movable member 202 is held at the position where the external force and the spring force of the springs 204 are balanced.

The magnets 205 and 206 are permanent magnets of rectangular parallelepipeds, and are held by the magnet holding members 202c together with the second correction lens 101c. Each of the coils 207 and 208 is formed by winding a conducting wire so as to form an ellipse shape with a hollow. The coil 207 is wound in a direction Ca in FIG. 2A, and the coil 208 is wound in a direction Cb in FIG. 2A. The coil 207 (208) is fixed by the coil holding member 201d so that a surface parallel to the winding direction of the conducting wire faces the magnet 205 (206) and inclines to the optical axis O (for example, FIG. 3C). A straight line A2a that is orthogonal to the winding direction of the conducting wire of the coil 207 and passes the center of the coil 207 is defined. And a straight line A2b that is orthogonal to the winding direction of the conducting wire of the coil 208 and passes the center of the coil 208 is defined. The straight lines A2a and A2b pass the point C2 (FIG. 3C), and intersect perpendicularly to each other when viewing in the direction of the optical axis O (FIG. 3A).

The sensor 209 (210) is provided with a Hall element that detects magnetic flux density. The sensor 209 (210) is fixed by the sensor holding member 201b so that a detection surface faces the magnet 205 (206). The sensor 209 (210)

detects the relative position of the magnet 205 (206) according to change of the detected magnetic flux density. The magnetic body 211 is magnetically adsorbed by the magnet 205, and is held by the magnet holding member 202c together with the magnet 205. The magnetic body 211 is formed in a plate shape having a predetermined thickness, and is a yoke made from soft magnetism material. In the embodiment, the magnetic body 211 is provided to the magnet 205 only, and is not provided to the other magnet 206. Hereinafter, the magnet 205, coil 207, sensor 209, and magnetic body 211 will be described as a first actuator 301, the magnet 206, coil 208, and sensor 210 will be described as a second actuator 302 (FIG. 3A). Since the first actuator 301 is configured by adding the magnetic body 211 to the second actuator 302, and the other configuration is identical to the second actuator 302, the first actuator 301 will be described as an example hereafter.

Figure 4A:
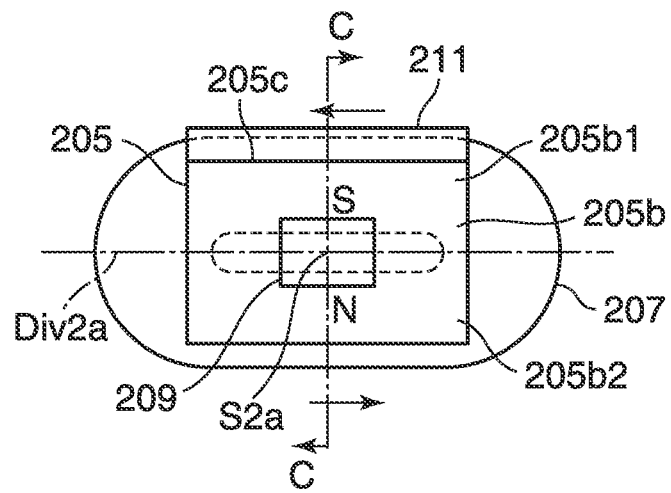
FIG. 4A is a plan view of a first actuator viewed along the line A2a in FIG. 3A from a sensor in FIG. 2A.
Figure 4B:
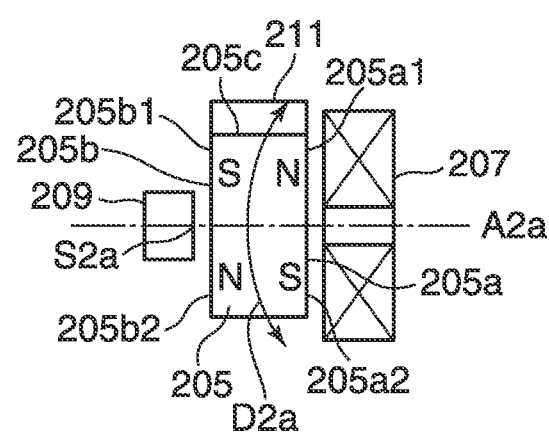
FIG. 4B is a sectional view taken along the line C-C in FIG. 4A.

FIG. 4A is a plan view of the first actuator 301 viewed along the line A2a in FIG. 3A from the sensor 209. FIG. 4B is a sectional view taken along the line C-C in FIG. 4A.

The magnet 205 has side surfaces 205a, 205b, and 205c as shown in FIG. 4A and FIG. 4B. The side surface 205a faces the coil 207. The side surface 205b is opposite to the side surface 205a, and faces the sensor 209. The side surface 205c is orthogonal to each of the side surfaces 205a and 205b. The magnetic body 211 is adsorbed to the side surface 205c. The side surfaces 205a and 205b are magnetized by mutually different magnetic poles divided by a boundary layer Div2a. For example, a divided face 205b1 divided by the boundary layer Div2a in the side surface 205b is magnetized by S pole, and a divided face 205b2 is magnetized by N pole. Moreover, the side surfaces 205a and 205b are magnetized by mutually different magnetic poles. In this example, since the divided face 205b1 is magnetized by the S pole, the divided face 205a1 that is the opposite side of the divided face 205b1 is magnetized by the N pole as shown in FIG. 4B. On the other hand, since the divided face 205b2 is magnetized by the N pole, the divided face 205a2 that is the opposite side of the divided face 205b2 is magnetized by the S pole.

When electric current flows into the coil 207 in the first actuator 301, an electric field occurs in the coil 207 and Lorentz force occurs in the direction along the side surfaces 205a and 205b with respect to the magnet 205. Accordingly, the movable member 202 moves in the direction of D2a shown in FIG. 3C and FIG. 4B around the point C2 together with the magnet 205 according to the Lorentz force concerned. After that, the movable member 202 is held at the position where the Lorentz force and the spring force of the springs 204 are balanced. The first actuator 301 controls the Lorentz force by adjusting the electric current that flows into the coil 207. Moreover, the direction of the Lorentz force is controlled by adjusting the direction of the electric current that flows into the coil 207. For example, when the electric current flows into the coil 207 in the reverse direction of the winding direction of the coil 207, the movable member 202 rotates counterclockwise around the point C2 as shown in FIG. 3D. Moreover, when the electric current flows into the coil 207 in the same direction of the winding direction of the coil 207, the movable member 202 rotates clockwise around the point C2 as shown in FIG. 3E. Accordingly, the first actuator 301 moves the second correction lens 101c supported by the movable member 202, and controls the optical axis Oc of the second correction lens 101c. Similarly, the second actuator 302 moves the second correction lens 101c in the direction orthogonal to the line A2b and the direction D2a with the magnet 206 and the coil 208, and controls the optical axis Oc of the second correction lens 101c. In the embodiment, the lens barrel 100 moves the image formed on the image plane I in a direction orthogonal to the optical axis O by controlling the first actuator 301 and the second actuator 302 to adjust the optical axis Oc of the second correction lens 101c.

Figure 5:
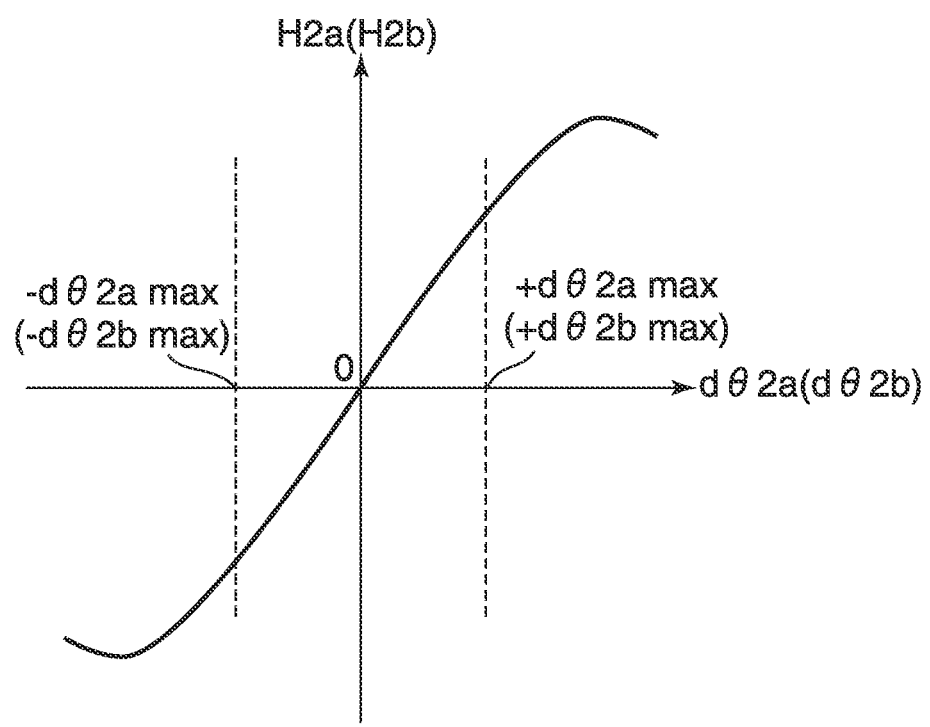
FIG. 5 is a graph for describing magnetic flux density detected with the sensor.

The moved position of the movable member 202 is detected according to the changes of the magnetic flux densities of the magnets 205 and 206 respectively detected by the sensors 209 and 210. When the movement of the movable member 202 changes the relative positional relationship between the center point S2a (S2b) of the sensor 209 (210) and the magnet 205 (206), the magnetic flux density detected by the sensor 209 (210) also changes. FIG. 5 is a graph showing a relationship between the magnetic flux density H2a (H2b) detected by the sensor 209 (210) and the rotated angle dθ2a (dθ2b) of the movable member 202 with reference to the position in the reference state. In the embodiment, the moving range of the movable member 202 is set from −dθ2amax (−dθ2bmax) to +dθ2amax (+dθ2bmax) from the point of view of ease of control.

Figure 6A:
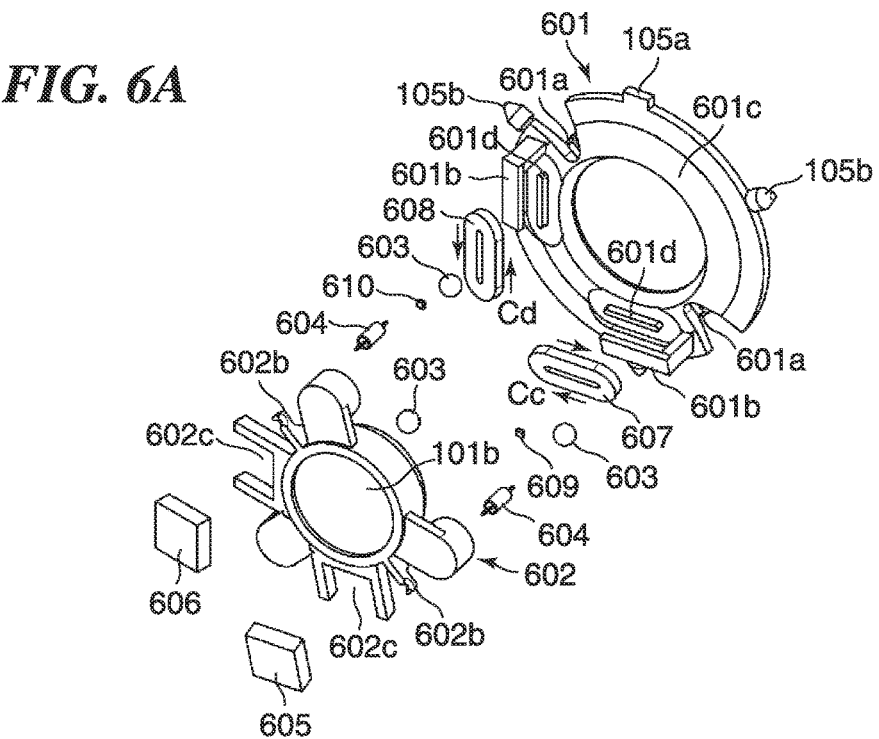
FIG. 6A is an exploded perspective view of a first image stabilizer in FIG. 1A viewed from the object side.
Figure 6B:
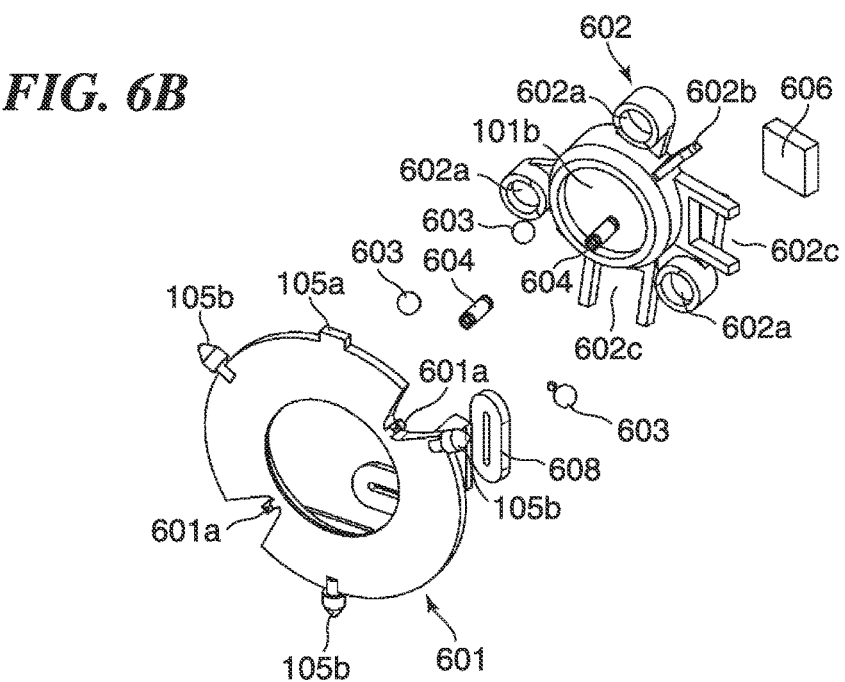
FIG. 6B is an exploded perspective view of the first image stabilizer viewed from the image plane side.

FIG. 6A is an exploded perspective view of the first image stabilizer 105 in FIG. 1A viewed from the object side. FIG. 6B is an exploded perspective view of the first image stabilizer 105 viewed from the image plane I. FIG. 7A is a plan view of the first image stabilizer 105 in FIG. 6A after assembling viewed from the object side. FIG. 7B is a sectional view taken along the line D-D in FIG. 7A. FIG. 7C is a sectional view taken along the line E-E in FIG. 7A. FIG. 7D is a sectional view taken along the line F-F in FIG. 7A.

As shown in FIG. 6A, FIG. 6B, and FIG. 7A through FIG. 7D, the first image stabilizer 105 is provided with a fixed member (support member) 601, movable member 602, balls 603, springs 604, magnets (first magnets) 605 and 606, coils 607 and 608, and sensors 609 and 610. It should be noted that FIG. 7A through FIG. 7D show the reference state of the first image stabilizer 105 where the first correction lens 101b and the movable member 602 are arranged so that an optical axis of the first correction lens 101c coincides with the optical axis O.

The fixed member 601 has a predetermined thickness, and is formed in an approximately disc shape around the optical axis O. The fixed member 201 is provided with an outer surface parallel to the optical axis O, a facing surface facing the movable member 602, and an opening through which the light transmitted through the first correction lens 101b passes in the center. The fixed member 601 is provided with the guide key 105a, three cam pins 105b, two spring hooks 601a, two sensor holding members 601b, ball support portion 601c, and two coil holding members 601d. The guide key 105a and the cam pins 105b are projected from the outer surface perpendicularly to the optical axis O. The spring hooks 601a are formed in beam shapes and are projected from the outer surface perpendicularly to the optical axis O at equal angular intervals. Each of the sensor holding members 601b has a base portion that is projected from the facing surface toward the movable member 602 so as to incline outwardly and a holding portion that is bent perpendicularly from a front end of the base portion so as to extend in a tangential direction of the outer surface. Each of the sensors 609 and 610 is held by a front end of the holding portion. The two sensor holding members 601b are arranged at the angular interval of 90 degrees around the optical axis O. The ball support portion 601c is a part of a convex spherical surface of the radius R1a around the point C1 on the optical axis O, and faces the movable member 602. The coil holding members 601d are formed on the ball support portion 601c at the angular interval of 90 degrees around the optical axis O, and respectively hold the coils 607 and 608.

The movable member 602 is formed in an approximately disc shape around the optical axis O. The movable member 602 holds the first correction lens 101b in the center, and its outer surface is parallel to the optical axis O. Moreover, the movable member 602 is provided with three ball support portions 602a, two spring hooks 602b, and two magnet holding members 602c. Each of the ball support portions 602a is a part of a concave spherical surface of the radius R1b around the point C1 on the optical axis O. The ball support portions 602a are projected from the outer surface perpendicularly to the optical axis O at equal angular intervals. The spring hooks 201b are formed in beam shapes and are projected from the outer surface perpendicularly to the optical axis O at equal angular intervals. Each of the magnet holding members 602c is provided with two parallel arms extended outwardly from the outer surface, and each of the magnets 605 and 606 is held between the arms. The arms of each of the magnet holding members 602c are formed so that their front ends incline toward the fixed member 601 as shown in FIG. 7C and FIG. 7D. The two magnet holding members 602c are arranged at the angular interval of 90 degrees around the optical axis O.

As shown in FIG. 7B, the movable member 602 is held by the fixed member 601 with the springs 604 hung between the spring hooks 602b and the spring hooks 601a of the fixed member 601. As shown in FIG. 7C, the movable member 602 contacts the fixed member 601 via the balls 603. Each of the balls 603 is formed in a spherical shape of the diameter d1. The movable member 602 moves along the ball support portion 601c, when the balls 603 that are caught between the ball support portion 601c and the ball support portions 602a rotate. Accordingly, the first correction lens 101b provided in the movable member 602 is movable along the spherical surface around the point C1 on the optical axis O with respect to the fixed member 601. When external force does not act on the movable member 602, the movable member 602 is held at the position in the reference state by balancing the spring force of the springs 604. On the other hand, when the external force acts on the movable member 602, the movable member 602 moves from the position in the reference state, and the movable member 602 is held at the position where the external force and the spring force of the springs 604 are balanced.

Figure 8:
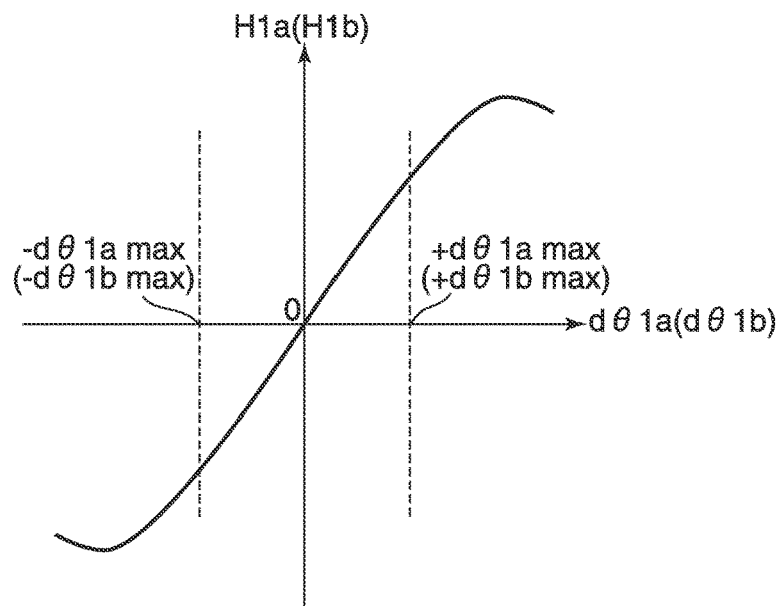
FIG. 8 is a graph for describing magnetic flux density detected by a sensor in FIG. 6A.

The magnets 205 and 206 are permanent magnets of rectangular parallelepipeds, and are held by the magnet holding members 602c together with the first correction lens 101b. Each of the coils 607 and 608 is formed by winding a conducting wire so as to form an ellipse shape with a hollow. The coil 607 is wound in a direction Cc in FIG. 6A, and the coil 608 is wound in a direction Cd in FIG. 6A. The coil 607 (608) is fixed by the coil holding member 601d so that a surface parallel to the winding direction of the conducting wire faces the magnet 605 (606) and inclines to the optical axis O (for example, FIG. 7C). A straight line A1a that is orthogonal to the winding direction of the conducting wire of the coil 607 and passes the center of the coil 607 is defined. And a straight line A1b that is orthogonal to the winding direction of the conducting wire of the coil 608 and passes the center of the coil 608 is defined. The straight lines A2a and A2b pass the point C2, and intersect perpendicularly to each other when viewing in the direction of the optical axis O. The sensor 609 (610) is provided with a Hall element that detects magnetic flux density. The sensor 609 (610) is fixed by the sensor holding member 601b so that a detection surface faces the magnet 605 (606). The sensor 609 (610) detects the relative position of the magnet 605 (606) according to change of the detected magnetic flux density. FIG. 8 is a graph showing a relationship between the magnetic flux density H1a (H1b) detected by the sensor 609 (610) and the rotated angle dθ1a (dθ1b) of the movable member 602 with reference to the position in the reference state. In the embodiment, the moving range of the movable member 602 is set from −dθ1amax (−dθ1bmax) to +dθ1amax (+dθ1bmax) from the point of view of ease of control. Hereinafter, the magnet 605, coil 607, and sensor 609 will be described as a third actuator 701, the magnet 606, coil 608, and sensor 610 will be described as a fourth actuator 702.

Next, the arrangement of the actuators provided in the lens barrel will be described. It should be noted that the embodiment is premised on the case where the magnet 605 and the coil 607 approach the magnet 205 as an example of the magnetic attraction caused by the magnets 205.

Figure 9:
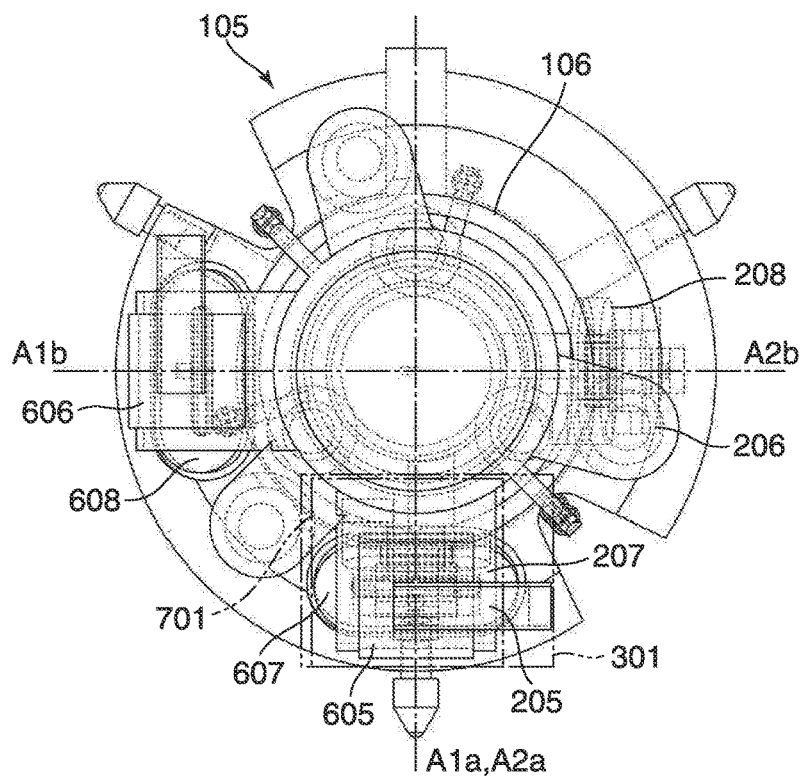
FIG. 9 is a plan view showing an example of arrangement of the actuators provided in the lens barrel of FIG. 1A.

FIG. 9 is a plan view showing an example of arrangement of the actuators provided in the lens barrel 100 in FIG. 1A.

Figure 10:
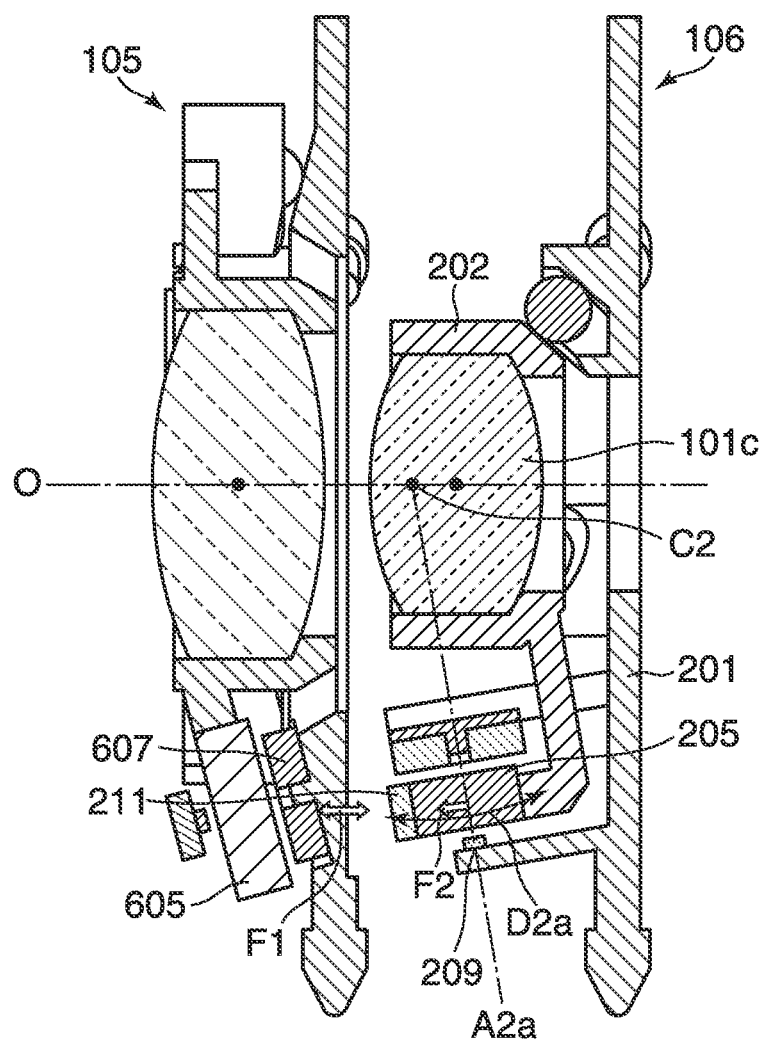
FIG. 10 is a sectional view for describing magnetic attraction that occurs between the first image stabilizer and the second image stabilizer in FIG. 1A.

The first actuator 301 and the third actuator 701 are arranged so as to overlap when viewing along the optical axis O as shown in FIG. 9. For example, when the lenses are located at the positions in the TELE state, the magnet 205 approaches the magnet 605 and the coil 607. In this case, the magnetic attraction F1 parallel to the optical axis O occurs between the magnet 205 and the magnet 605 and coil 607 as shown in FIG. 10 due to magnetic interference between the magnet 205 and the magnet 605 and coil 607. The magnetic attraction F1 concerned may unintentionally move the movable member 202 having the magnet 205 and the movable member 602 having the magnet 605 and the coil 607.

Figure 11A:
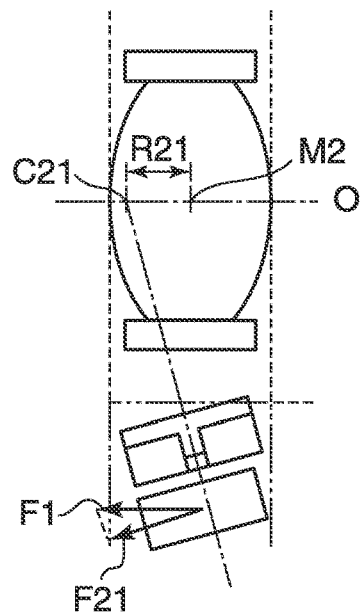
FIG. 11A and FIG. 11B are views for describing action forces that act on magnets of image stabilizers of which rotating radii are different according to the magnetic attraction in FIG. 10.
Figure 11B:
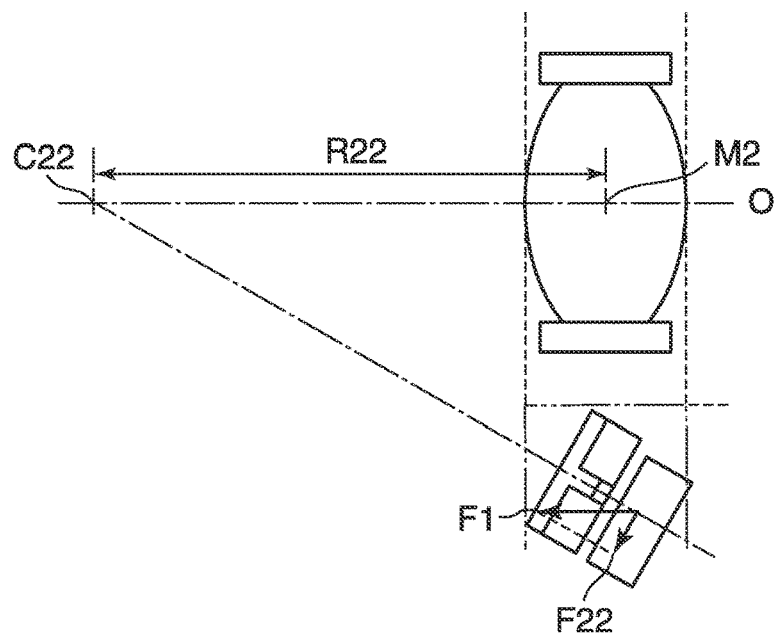

For example, as shown in FIG. 10, action force F2 as component force of the magnetic attraction F1 acts on the magnet 205 of the movable member 202. FIG. 11A and FIG. 11B are views for describing action force F21 and action force F22 that act on magnets of image stabilizers of which rotating radii are different. The action force F21 (FIG. 11A) that occurs in the movement with the rotating radius R21 around the point C21 is larger than the action force F22 (FIG. 11B) that occurs in the movement with the rotating radius R22, which is larger than the radius R21, around the point C22. That is, the action force F2 increases as the rotating radius decreases. In the embodiment, the rotating radius of the movable member 202 including the magnet 205 is smaller than the rotating radius of the movable member 602 including the magnet 605. Accordingly, if no measures are taken, the magnet 205 would tend to deviate from a desired position due to the action force F2. As a result, the second correction lens 101c provided on the movable member 202 may move to an unintended position, which may deteriorate the image formed on the image plane I.

Against this, the lens barrel 100 of the embodiment has the magnetic body 211 that reduces leakage of the magnetic flux between the magnet 205 and the magnet 605 on the movable member 202 of the second image stabilizer 106 of which the rotating radius is smaller than that of the movable member 602 of the first image stabilizer 105.

Figure 12A:
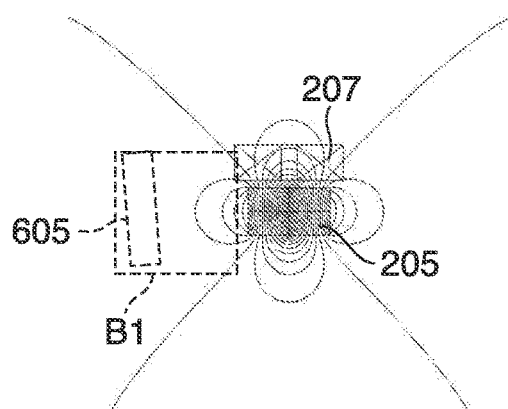
FIG. 12A is a view showing magnetic lines around the magnet of the second image stabilizer in a case where the second image stabilizer in FIG. 1A would not provide a magnetic body.
Figure 12B:
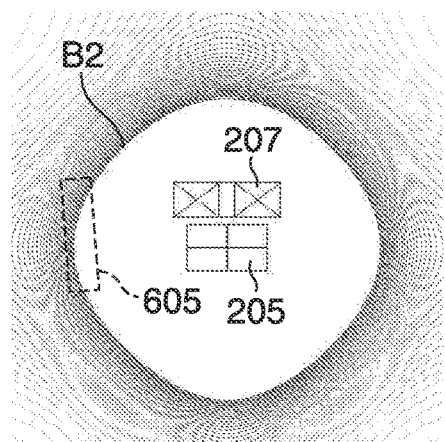
FIG. 12B is a view showing magnetic flux density around the magnet of the second image stabilizer in the case where the second image stabilizer would not provide a magnetic body.
Figure 12C:
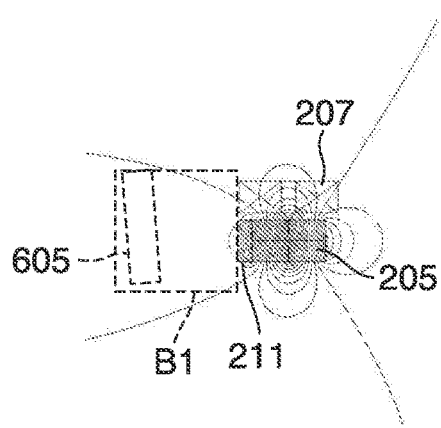
FIG. 12C is a view showing magnetic lines around the magnet of the second image stabilizer in a case where the second image stabilizer provides the magnetic body.
Figure 12D:
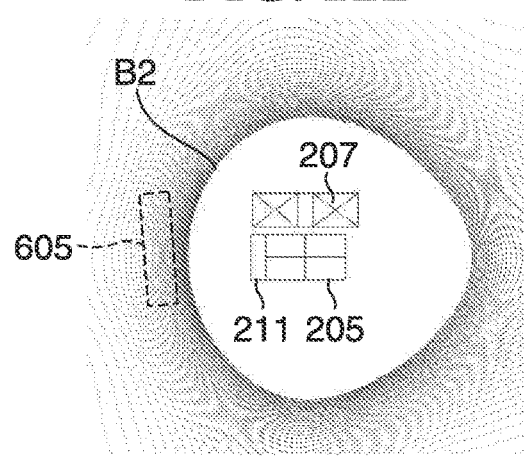
FIG. 12D is a view showing magnetic flux density around the magnet of the second image stabilizer in the case where the second image stabilizer provides the magnetic body.

FIG. 12A is a view showing magnetic lines around the magnet 205 of the second image stabilizer 106 in a case where the second image stabilizer 106 would not provide the magnetic body 211. FIG. 12B is a view showing magnetic flux density around the magnet 205 of the second image stabilizer 106 in the case where the second image stabilizer 106 would not provide the magnetic body 211. FIG. 12C is a view showing magnetic lines around the magnet 205 of the second image stabilizer 106 in a case where the second image stabilizer 106 provides the magnetic body 211. FIG. 12D is a view showing magnetic flux density around the magnet 205 of the second image stabilizer 106 in the case where the second image stabilizer 106 provides the magnetic body 211.

As shown in FIG. 12A and FIG. 12C, when the magnetic body 211 is in contact with the adjacent surface of the magnet 205 that is closer to the magnet 605 among surfaces adjacent to a surface facing the coil 207, the magnetic force between the magnet 605 and the magnet 205 (for example, in a region B1) becomes small. Moreover, as shown in FIG. 12B and FIG. 12D, when the magnetic body 211 is in contact with the adjacent surface of the magnet 205 that is closer to the magnet 605 among surfaces adjacent to a surface facing the coil 207, a region B2 in which the magnetic flux density is the same as that near the magnet 205 becomes small, and the magnetic flux density near the magnet 605 becomes low. That is, when the magnetic body 211 is provided to the magnet 205, the leakage of the magnetic flux from the magnet 205 is reduced. As a result, the magnetic attraction F1 that occurs by the leakage of the magnetic flux from the magnet 205 decreases. Although the magnetic interference between the magnet 205 and the magnet 605 is described in the embodiment, the arrangement of the magnetic body 211 reduces the magnetic interference between the magnet 205 and the coil 607 in the same manner.

In the embodiment, the lens barrel 100 has the magnetic body 211 that reduces leakage of the magnetic flux between the magnet 205 and magnet 605 on the movable member 202 of the second image stabilizer 106 of which the rotating radius is smaller than that of the movable member 602 of the first image stabilizer 105. This reduces the magnetic attraction F1 that occurs by the leakage of the magnetic flux of the magnet 205, and accordingly, reduces unnecessary movement of the second correction lens 101c due to the magnetic attraction F1. Moreover, since the magnetic attraction F1 is reduced, the second image stabilizer 106 is able to approach the first image stabilizer 105 as compared with the conventional configuration, which improves the degree of freedom of arrangement.

In the embodiment, it is enough that the magnetic body 211 is provided between the magnet 605 and the magnet 205 from a viewpoint of reducing the magnetic interference between the magnet 605 and the magnet 205. However, since the second correction lens 101c moves with the rotating radius R2 that is smaller than the rotating radius of the first correction lens 101b, the second correction lens 101c tends to deviate from a desired position due to unnecessary action force. Accordingly, it is preferable to provide the magnetic body 211 in the second image stabilizer 106 that has the second correction lens 101c. In this case, the magnetic attraction that occurs between the magnetic body 211 and the magnet 205 does not act on the movable member 202 of the second image stabilizer 106, which prevents the deviation of the second correction lens 101c from a desired position.

Moreover, in the embodiment, the magnetic body 211 is the yoke made from the soft magnetism material. Accordingly, the magnetic body 211 is constituted easily, which avoids the configuration of the second image stabilizer 106 from becoming too complicated, and suppresses the rise of cost.

Furthermore, in the embodiment, the magnet 205 is arranged at the position that overlaps with at least one of the magnet 605 and the coil 607 when viewing in the direction along the optical axis O. Moreover, the magnetic body 211 is arranged at the position that overlaps with at least one of the magnet 605 and the coil 607 when viewing in the direction along the optical axis O. Accordingly, the magnetic body 211 efficiently interrupts the magnetic flux toward the magnet 205 from the magnet 605 and the coil 607.

Although the present invention was described above using the embodiment, the present invention is not limited to the embodiment mentioned above.

Figure 13:
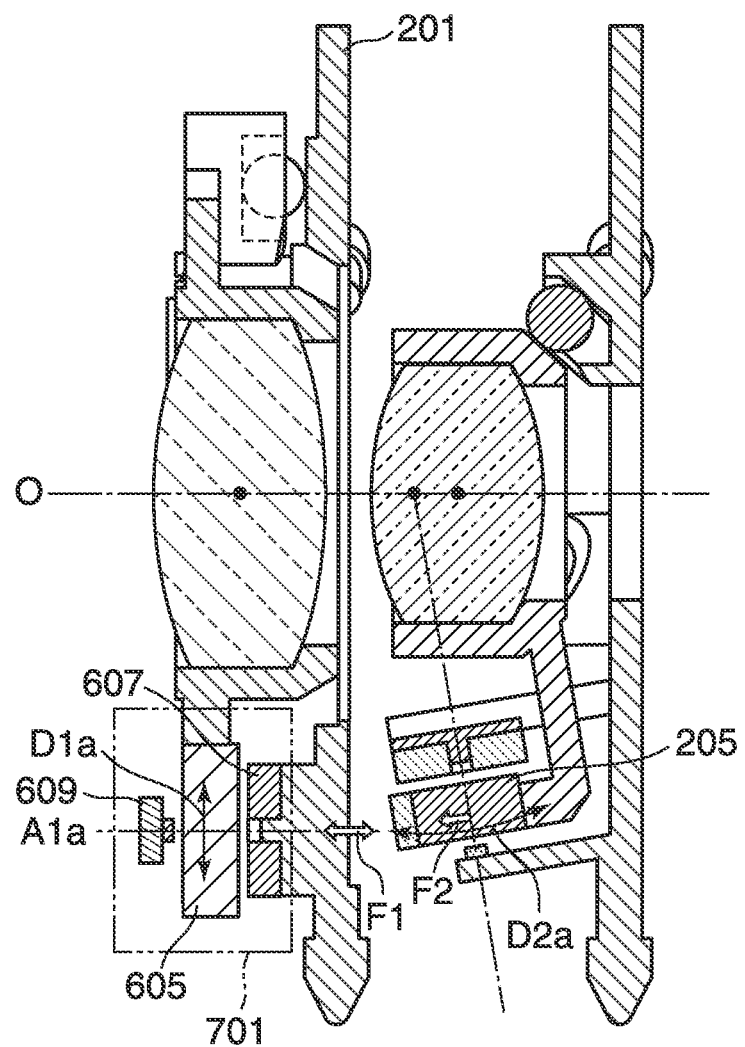
FIG. 13 is a sectional view for describing a modified example of the first image stabilizer in FIG. 1A.

For example, the first image stabilizer 105 may move the lens linearly within a plane perpendicular to the optical axis (i.e., the lens may be moved along a spherical surface around an infinite point (flat surface)). In this case, as shown in FIG. 13, the third actuator 701 is arranged so that the straight line Ala becomes parallel to the optical axis O. Even in this case, the magnetic body 211 reduces the magnetic attraction F1 that occurs by the leakage of the magnetic flux of the magnet 205, and accordingly, reduces unnecessary movement of the second correction lens 101c due to the magnetic attraction F1.

Figure 14A:
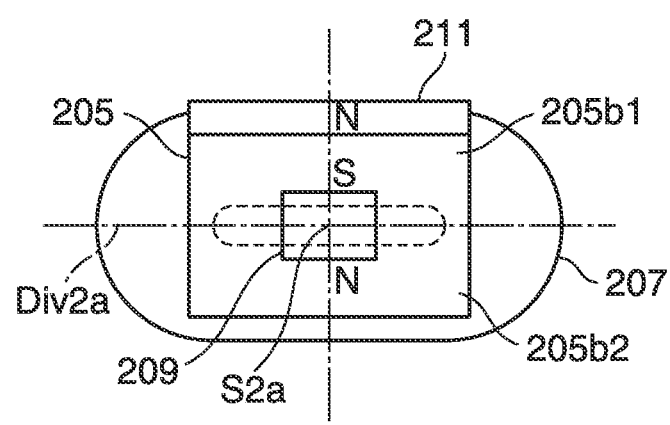
FIG. 14A and FIG. 14B are views for describing a modified example of the magnetic body in FIG. 2A.
Figure 14B:
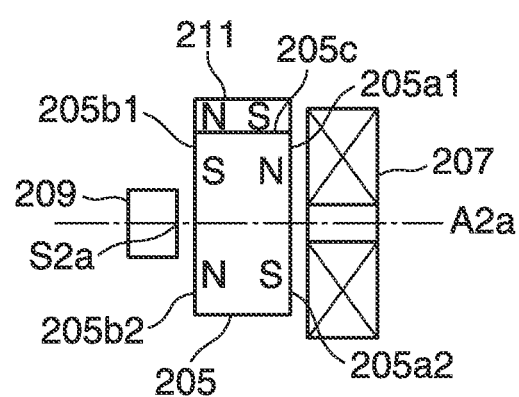

Moreover, the magnetic body 211 may be a magnetized portion that is made from the same material as the magnet 205 integrally. In such a case, the magnetic body 211 is magnetized in magnetic poles that are different from the magnetic poles of the magnet 205 at the facing part facing the magnet 605 as shown in FIG. 14A and FIG. 14B. For example, when the facing part of the magnet 205 that faces the magnet 605 is in the S pole as shown in FIG. 14A, the magnetic body 211 is magnetized in the N pole. Accordingly, the magnetic body 211 and the magnet 205 are configured integrally, which simplifies the configuration of the second image stabilizer 106 more.

In the embodiment, it is preferable that the thickness of the magnetic body 211 is below a half of the thickness of the magnet 205 in the arrangement direction of the magnetic body 211 and the magnet 205. This prevents the second image stabilizer 106 including the magnetic body 211 and the magnet 205 from becoming too large, and accordingly, prevents obstruction of the drive of the first image-stabilizer 105 that approaches the second image stabilizer 106.

In the embodiment, it is preferable that the magnetic body 211 covers the magnet 205 when viewing in the arrangement direction of the magnetic body 211 and the magnet 205. This certainly reduces the magnetic attraction F1 that occurs due to the leakage of the magnetic flux of the magnet 205.

Figure 15:
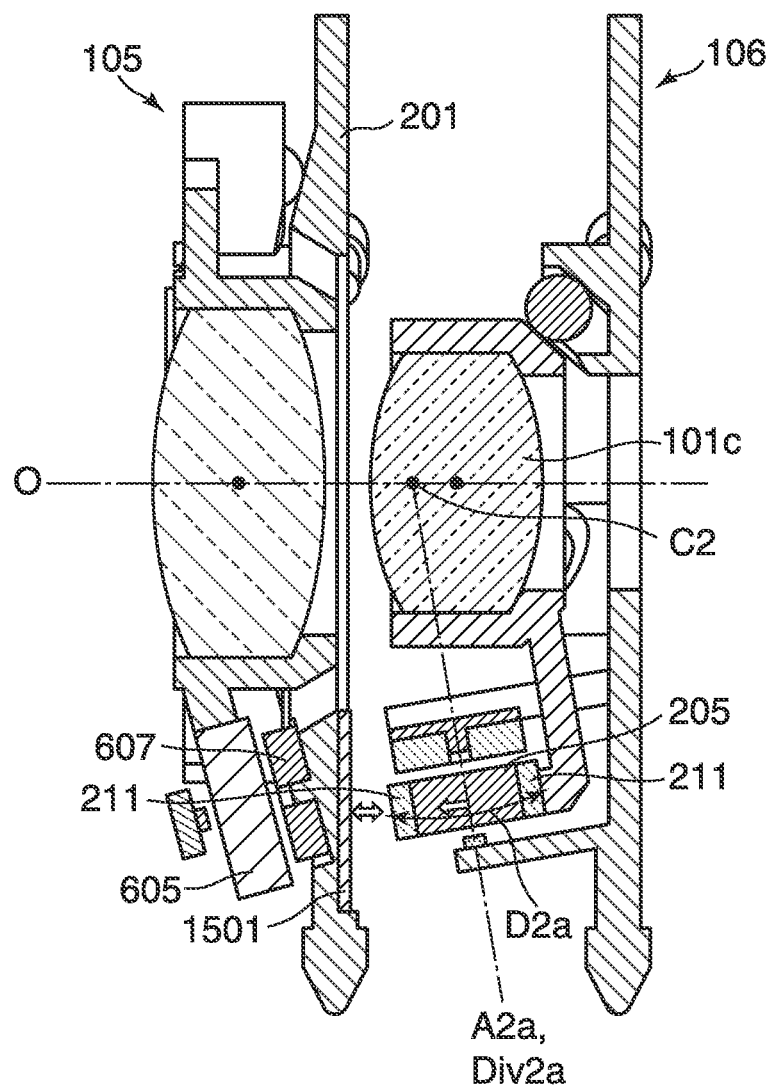
FIG. 15 is a sectional view for describing a magnetic shield provided in a fixed member in FIG. 6A.

Moreover, a part, which faces the magnet 605, of the fixed member 601 provided on the first image stabilizer 105 may be formed as a magnetic shield 1501 that reduces leakage of the magnetic flux of the magnet 605 as shown in FIG. 15. This certainly reduces the magnetic attraction F1 that occurs by the leakage of the magnetic flux of the magnet 605.

Furthermore, the magnetic bodies 211 may be arranged so as to reduce the leakage of the magnetic flux of the magnet 205 from both of the facing part facing the magnet 605 and the non-facing part opposite to the facing part. Specifically, the magnetic bodies 211 may be arranged at both of the facing part facing the magnet 605 and the non-facing part opposite to the facing part of the magnet 205 as shown in FIG. 15. This makes uniform the magnetic force generated from the facing part facing the magnet 605 and the non-facing part opposite to the facing part of the magnet 205, which reduces degradation of the controllability of the second correction lens 101c due to ununiformity of the magnetic force generated from the magnet 205.

In the embodiment, it is preferable that the action force F2 acting on the magnet 205 as a component force of the magnetic attraction F1 is smaller than the static friction force at the time of rotating the balls 203. Accordingly, even if the magnetic attraction F1 occurs, the action force F2 is negated by the static friction force, and the balls 203 do not rotate. This certainly reduces unnecessary movement of the second correction lens 101c due to the magnetic attraction F1.

Although the first correction lens 101b and the second correction lens 101c are used as the first and second correction optical elements in the embodiment, an image stabilizing optical element is not limited to the first correction lens 101b and the second correction lens 101c. For example, an image pickup device, a prism, or the like may be used as an image stabilizing optical element.

Although the first image stabilizer 105 employs a moving magnet system where the coils 607 and 608 are fixed to the fixed member 601 and the magnets 605 and 606 are fixed to the movable member 602 that supports the first correction lens 101b in the embodiment, the system is not limited to the moving magnet system. For example, a moving coil system where the magnets 605 and 606 are fixed to the fixed member 601 and the coils 607 and 608 are fixed to the movable member 602 that supports the first correction lens 101b may be employed.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-133355, filed Jul. 2, 2015, which is hereby incorporated by reference herein in its entirety.

What is claimed is:

1. A lens barrel comprising:
a first unit configured to have a first correction optical element arranged on an optical axis, and a first magnet that moves the first correction optical element along a first virtual spherical surface with a first radius around a spherical center thereof on the optical axis;
a second unit configured to have a second correction optical element arranged on the optical axis, and a second magnet that moves the second correction optical element along a second virtual spherical surface with a second radius smaller than the first radius around a spherical center thereof on the optical axis; and
a magnetic body configured to be arranged on at least one of said first unit and said second unit, and to reduce leakage of magnetic flux from a facing part of the second magnet that faces the first magnet.

2. The lens barrel according to claim 1, wherein said magnetic body is arranged on said second unit.

3. The lens barrel according to claim 1, wherein said magnetic body is made from soft magnetic material.

4. The lens barrel according to claim 1, wherein said magnetic body is a yoke.

5. The lens barrel according to claim 1, wherein said magnetic body is magnetized in a magnetic pole that is different from a magnetic pole of the second magnet at the facing part facing the first magnet.

6. The lens barrel according to claim 1, wherein said first unit has a coil arranged so as to face the first magnet, and
wherein the second magnet is arranged at a position that overlaps with at least one of the first magnet and the coil when viewing from a direction along the optical axis.

7. The lens barrel according to claim 1, wherein said magnetic body is formed in a plate shape, and thickness of said magnetic body is below a half of thickness of the second magnet in an arrangement direction of said magnetic body and the second magnet.

8. The lens barrel according to claim 7, wherein said magnetic body covers the second magnet when viewing in the arrangement direction of said magnetic body and the second magnet.

9. The lens barrel according to claim 1, wherein said magnetic body is arranged so as to reduce leakage of magnetic flux of the second magnet from both of the facing part facing the first magnet and a non-facing part opposite to the facing part.

10. The lens barrel according to claim 1, wherein said first unit has a support member that supports the first correction optical element movably, and
wherein a part of the support member that faces the first magnet is formed as a magnetic shield that reduces leakage of the magnetic flux of the first magnet.

11. The lens barrel according to claim 1, wherein said first unit is arranged at an object side of said second unit.

12. The lens barrel according to claim 1, wherein the first correction optical element and the second correction optical element are lenses.

13. The lens barrel according to claim 1, wherein said first unit and said second unit are supported to a base member individually.

14. An optical device comprising:
a first member holding a first coil;
a second member holding a first magnet of a rectangular parallelepied and a first optical element;
a first actuator configured to rotate said second member with respect to said first member using the first coil and the first magnet around a rotation axis that is not parallel to an optical axisof the first optical element;
a third member holding a second magnet and a second optical element; and
a second actuator configured to move said third member using said second magnet and a second coil,
wherein the first magnet is in contact with a magnetic body at one of adjacent surfaces adjacent to a surface facing the first coil so as to reduce magnetic flux density at the side of the one of the adjacent surfaces of the first magnet and the first magnet is arranged so as to overlap with at least one of the second magnet and the second coil in a direction parallel to a surface of the first magnet that faces the first coil, and
wherein the one of the adjacent surfaces is a surface closest to one of the second magnet and the second coil among the adjacent surfaces.

15. The optical device according to claim 14, wherein said second actuator is configured to rotate said third member around a rotation axis that is not parallel to an optical axis of the second optical element, and
wherein a rotating radius of said second member is smaller than a rotating radius of said third member.

16. The optical device according to claim 14, wherein the first magnet is in contact with another magnetic body at another one of the adjacent surfaces opposite to the one of the adjacent surfaces.

* * * * *